US009784131B2

(12) United States Patent
Feldmann et al.

(10) Patent No.: US 9,784,131 B2
(45) Date of Patent: Oct. 10, 2017

(54) SEALING ARRANGEMENT FOR A TURBOMACHINE, A GUIDE VANE ARRANGEMENT, AND A TURBOMACHINE WITH SUCH A SEALING ARRANGEMENT

(71) Applicant: MTU Aero Engines AG, Munich (DE)

(72) Inventors: Manfred Feldmann, Eichenau (DE); Karl-Heinz Dusel, Unterschleissheim (DE)

(73) Assignee: MTU AERO ENGINES AG, Munich (DE)

( * ) Notice: Subject to any disclaimer, the term of this patent is extended or adjusted under 35 U.S.C. 154(b) by 572 days.

(21) Appl. No.: 14/312,428

(22) Filed: Jun. 23, 2014

(65) Prior Publication Data
US 2015/0003970 A1 Jan. 1, 2015

(30) Foreign Application Priority Data
Jun. 27, 2013 (DE) .................. 10 2013 212 465

(51) Int. Cl.
F01D 11/00 (2006.01)
F01D 25/18 (2006.01)
F16J 15/44 (2006.01)
F01D 9/02 (2006.01)
B23K 101/02 (2006.01)

(52) U.S. Cl.
CPC ............ F01D 25/183 (2013.01); F01D 9/02 (2013.01); F01D 11/001 (2013.01); F16J 15/444 (2013.01); B23K 2201/02 (2013.01); F05D 2240/11 (2013.01); F05D 2250/283 (2013.01);
(Continued)

(58) Field of Classification Search
CPC ........ F01D 11/025; F01D 11/003; F01D 9/02; F01D 11/001; F01D 11/005; F01D 11/02; F01D 11/08; F01D 25/183; F05D 2240/11; F05D 2240/55; F05D 2250/283; F05D 2300/514; F05D 2300/612; F16J 15/162;
(Continued)

(56) References Cited
U.S. PATENT DOCUMENTS 6,682,299 B2 * 1/2004 Bowen ...................... F01D 9/02
384/273
8,650,753 B2 * 2/2014 Sellars .................... F16J 15/445
277/303
(Continued)

FOREIGN PATENT DOCUMENTS
DE 3244874 A1 7/1983
DE 102006004090 A1 8/2007
(Continued)

Primary Examiner — Kenneth Bomberg
Assistant Examiner — Sabbir Hasan
(74) Attorney, Agent, or Firm — Barlow, Josephs & Holmes, Ltd.

(57) ABSTRACT

The invention relates to a sealing arrangement 15, a guide vane arrangement, and a turbomachine 11 with such a sealing arrangement 15, wherein the sealing arrangement 15 is designed for a guide vane ring 60 of a turbomachine 11, wherein the sealing arrangement 15 comprises a thin-walled annular structure 80 that is substantially closed on all sides, and wherein the annular structure 80 delimits an annular interior space 105, wherein a hollow cell structure 109, which is designed so as to mechanically support the annular structure 80, is provided in the annular interior space 105.

2 Claims, 7 Drawing Sheets

(52) U.S. Cl.
CPC .. *F05D 2300/514* (2013.01); *F05D 2300/612* (2013.01); *Y02T 50/671* (2013.01)

(58) Field of Classification Search
CPC ........ F16J 15/187; F16J 15/20; F16J 15/4472; F16J 15/46; F16J 15/453; F16J 15/447
USPC ............ 415/171.1, 174.5, 230; 277/412, 415
See application file for complete search history.

(56) References Cited

U.S. PATENT DOCUMENTS

| | | | |
|---|---|---|---|
| 8,793,871 B2 * | 8/2014 | Morrison | B22D 19/00 29/527.5 |
| 2003/0082050 A1 | 5/2003 | Aschenbruck et al. | |
| 2010/0266391 A1 | 10/2010 | Schlichting et al. | |
| 2010/0291401 A1 | 11/2010 | Medina et al. | |
| 2011/0241295 A1 | 10/2011 | Voisine | |
| 2012/0237786 A1 | 9/2012 | Morrison et al. | |
| 2013/0000247 A1 | 1/2013 | Sypeck | |
| 2014/0105725 A1 * | 4/2014 | Stiehler | F01D 11/02 415/115 |

FOREIGN PATENT DOCUMENTS

| | | |
|---|---|---|
| DE | 102011108957 A1 | 1/2013 |
| EP | 1155760 A1 | 11/2001 |
| EP | 2196632 A2 | 6/2010 |
| EP | 2204539 A2 | 7/2010 |

* cited by examiner

B-B

SEALING ARRANGEMENT FOR A TURBOMACHINE, A GUIDE VANE ARRANGEMENT, AND A TURBOMACHINE WITH SUCH A SEALING ARRANGEMENT

BACKGROUND OF THE INVENTION

The invention relates to a sealing arrangement for a turbomachine, a guide vane arrangement, and a turbomachine with such a sealing arrangement, which comprises a thin-walled annular structure that is substantially closed on all sides, and wherein the annular structure delimits an annular interior space.

Known from DE 10 2006 004 090 A1 is a sealing arrangement of a gas turbine with a guide vane and an inner shroud arranged at the radially inner-lying end of the guide vane, wherein a sealing element is an integral component of the inner shroud and serves to seal a radially inner-lying gap between the sealing arrangement and the gas turbine rotor.

It is further known that sealing arrangements at guide vanes can be designed at least in part in an annular form and comprise a thin-walled annular structure, in order to reduce any gas flow through various gaps in the region of the sealing arrangement. In this case, the annular structure delimits an annular interior space. Usually, these designs must be composed of a plurality of parts that are assembled. Also, the gas present in the annular interior space can be induced to create vortexing through a movement of the annular structure, said vortexing causing additional friction in the gas turbine.

BRIEF SUMMARY OF THE INVENTION

It is the object of the invention to provide an improved sealing arrangement for a turbomachine, a guide vane arrangement, and a turbomachine with such a sealing arrangement.

This object is achieved by the embodiments of the sealing arrangement the present invention.

In accordance with the invention, it was known that an improved sealing arrangement can be provided in that the sealing arrangement comprises a thin-walled annular structure that is substantially closed on all sides and wherein the annular structure delimits an annular interior space. Furthermore, a hollow cell structure, which is designed so as to mechanically support the annular structure, is provided in the annular interior space.

In this way, it is ensured that, within the annular interior space, any vortexing due to a gas present there is prevented. Furthermore, the hollow cell structure supports the annular structure on the inside, so that the annular structure can be designed to be especially thin-walled, and the weight of the sealing arrangement is overall reduced.

It has been found to be especially advantageous when the hollow cell structure comprises a foam structure, preferably an open-pored foam, in particular preferably an open-pored metallic foam, as material. The open-pored nature of the foam has the advantage that, when the sealing arrangement is heated, which can usually occur up to 600° C., a pressure equalization occurs within the foam between the pores of the foam. In this way, it is prevented that, when the sealing arrangement is heated, the foam is subjected to unnecessarily high material loads due to expansion of the gas present in the foam.

In another embodiment, the hollow cell structure comprises a support structure, with the support structure having a honeycomb design. This configuration of the sealing arrangement is particularly rigid in one direction.

In another embodiment, the hollow cell structure has at least two webs and at least three nodal points, with the webs being linked at the nodal points to the annular structure and/or with the webs being linked among one another to form a framework. This design makes possible a particularly simple and load-adapted design of the sealing arrangement.

In another embodiment, the annular structure has at least one passage opening, which connects the annular interior space to the surroundings of the sealing arrangement, with the at least one passage opening being designed for pressure equalization of the annular interior space with its surroundings. If the guide vane ring, as explained above, is heated, then the gas present in the pores of the hollow cell structure flows through the hollow cell structure and ultimately through the passage opening, so that the gas contained in the hollow cell structure can be reliably discharged from the annular interior space, and hence any potential destruction of the annular structure resulting from an overpressure in the foam can be prevented.

In another embodiment, an additional passage opening for pressure equalization of the annular interior space is provided, with the passage opening and the additional passage opening being arranged on the same side of the annular structure. In this way, it is prevented that a gas flow occurs through both passage openings and the foam structure arranged in between them.

In another embodiment, the annular structure comprises at least one uptake on an outer peripheral surface, said uptake being designed to accommodate at least one annular member of the guide vane ring. In this way, it is possible to fasten the sealing arrangement to the guide vane ring in a simple manner.

In another embodiment, the uptake has a first contact surface arranged on the upstream side and a second contact surface arranged on the downstream side, with the annular structure having a first wall thickness at the first contact surface and a second wall thickness at the second contact surface, with the first wall thickness differing from the second wall thickness. In this way, the force acting on the annular structure, resulting, for example, from the higher first pressure applied on the upstream side in comparison to a second pressure applied to the annular structure on the downstream side, can be reliably diverted into the annular structure via the first contact surface. At the same time, the sealing arrangement can be designed to be especially lightweight. Thus, in a turbine, the first wall thickness can be designed to be greater than the second wall thickness, while in a compressor, the second wall thickness can be designed to be greater than the first wall thickness, so as to provide a load-adapted sealing arrangement.

It is especially advantageous when a radial inner-lying sealing structure is provided at the annular structure and preferably has a honeycomb or foam-like design, with the hollow cell structure comprising a first mean pore size and the sealing structure comprising a second mean pore size, with the first mean pore size of the hollow cell structure being smaller than the second mean pore size of the sealing structure.

In another embodiment, the annular structure and the hollow cell structure and preferably the sealing structure are designed to be one-piece and uniform in material. In this way, it is possible to provide an especially rigid sealing arrangement.

In another embodiment, at least the annular structure and the hollow cell structure and advantageously the sealing structure are fabricated jointly by means of a laser powder deposition welding process or by means of a selective laser melting process or by means of a selective laser sintering process. Each of the processes mentioned makes possible an especially fine and precisely defined fabrication of the hollow cell structure while simultaneously bonding it to the annular structure, so that individual walls of the hollow cell structure merge directly into the annular structure and hence an especially rigid sealing arrangement can be provided. Furthermore, fluctuations in the fabrication of the hollow cell structure during conventional foaming of the foam material, for example, can be reliably prevented, because each individual pore or cell of the hollow cell structure and also of the annular structure can be specified in a defined manner by means of the selective laser melting process or the selective laser sintering process or the laser powder deposition welding process.

It has also been found to be especially advantageous when the hollow cell structure and the annular structure comprise an essentially identical material, with the material comprising at least one of the following constituents: steel, aluminum, ceramic, titanium, nickel, cobalt.

The invention will also be accomplished, however, by a guide vane arrangement as described below.

In accordance with the invention, it was recognized that an improved guide vane arrangement can be provided in that the guide vane arrangement comprises a guide vane ring and a sealing arrangement, with the sealing arrangement being arranged at the guide vane ring in a radially outer-lying and/or radially inner-lying manner, with the sealing arrangement being designed as explained above.

In this way, it is possible to reduce any leakage-gas flow that occurs lateral to the guide vane ring without passing the guide vane ring, so that the gas flow diverted through the guide vane ring can be increased.

The invention is also accomplished, however, by a turbomachine having the features described below.

In accordance with the invention, it was recognized that an improved turbomachine can be provided in that the turbomachine comprises at least one rotor disk arranged so as to rotate and at least one stator, with the rotor disk comprising at least one rotor blade and the stator comprising at least one guide vane ring, with the at least one rotor blade being assigned to the at least one guide vane ring, and with at least one sealing arrangement being provided at the at least one guide vane ring on the radially outer side and/or on the radial inner side, said sealing arrangement being designed as explained above.

BRIEF DESCRIPTION OF THE DRAWINGS

The invention will be explained in detail below on the basis of figures. Shown are.

DETAILED DESCRIPTION OF THE INVENTION

Figure 1:
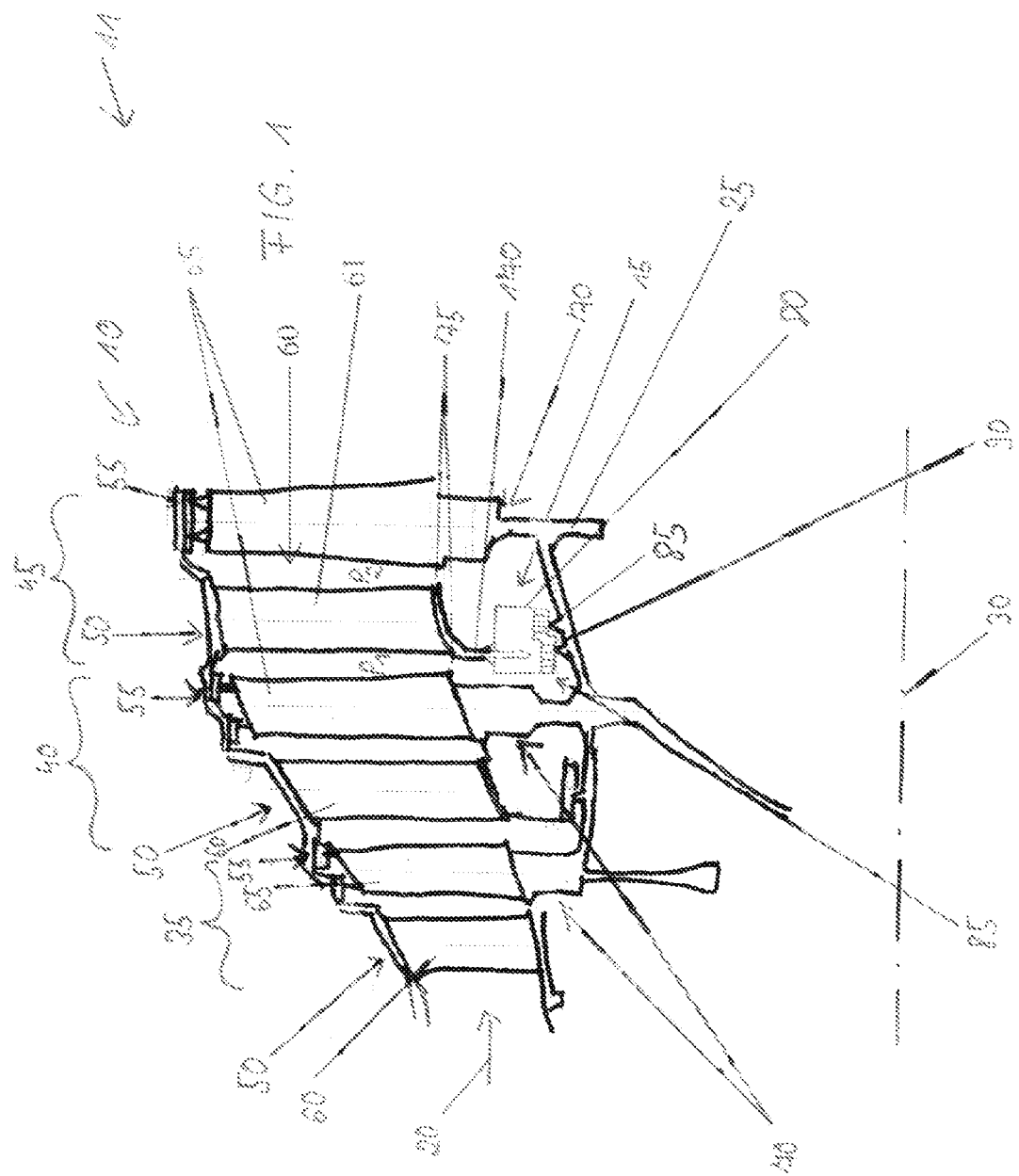
FIG. 1, a longitudinal section through a turbine of a gas turbine.
Figure 2:
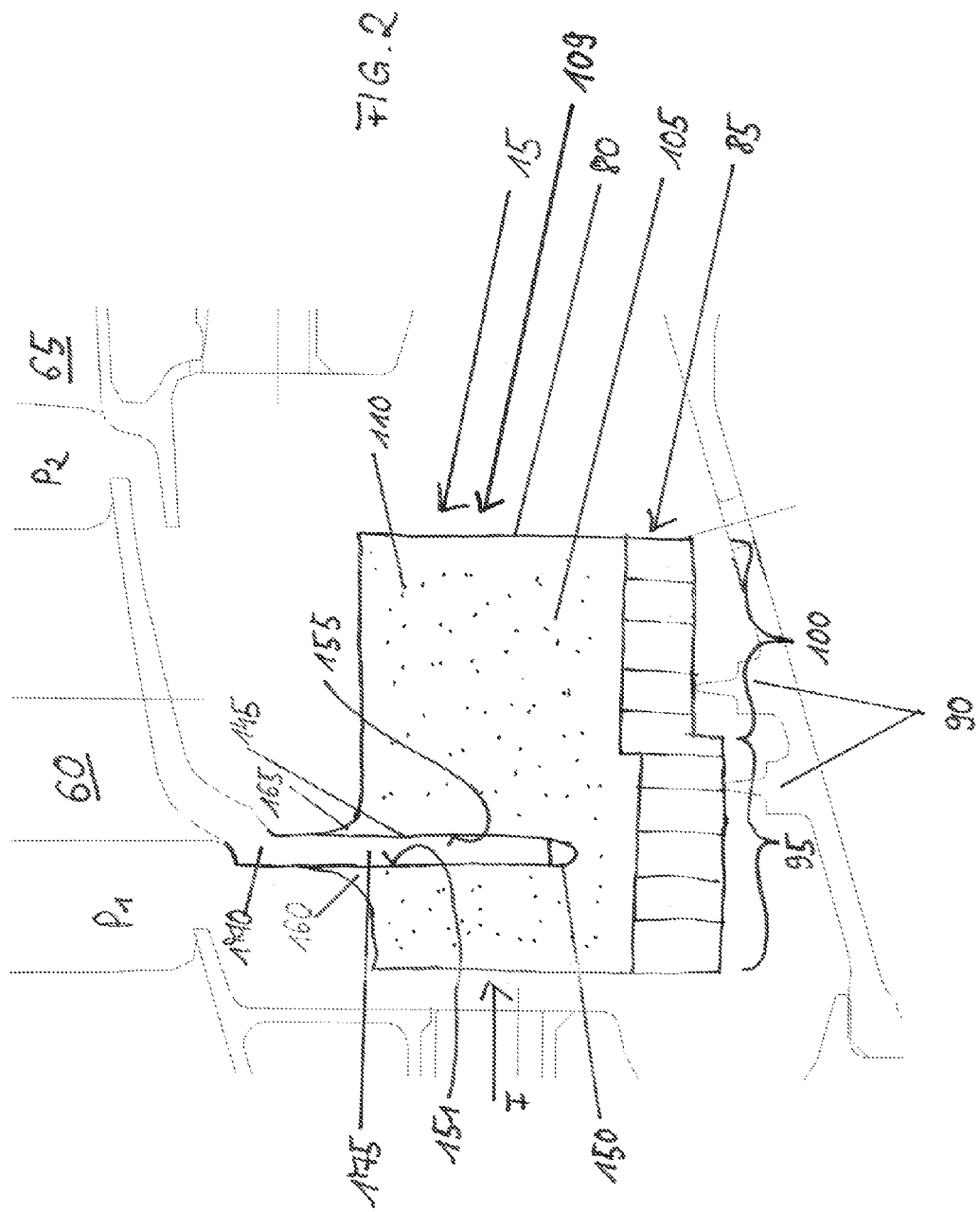
FIG. 2, a cutout of the longitudinal section shown in FIG. 1 with a sealing arrangement.
Figure 3:
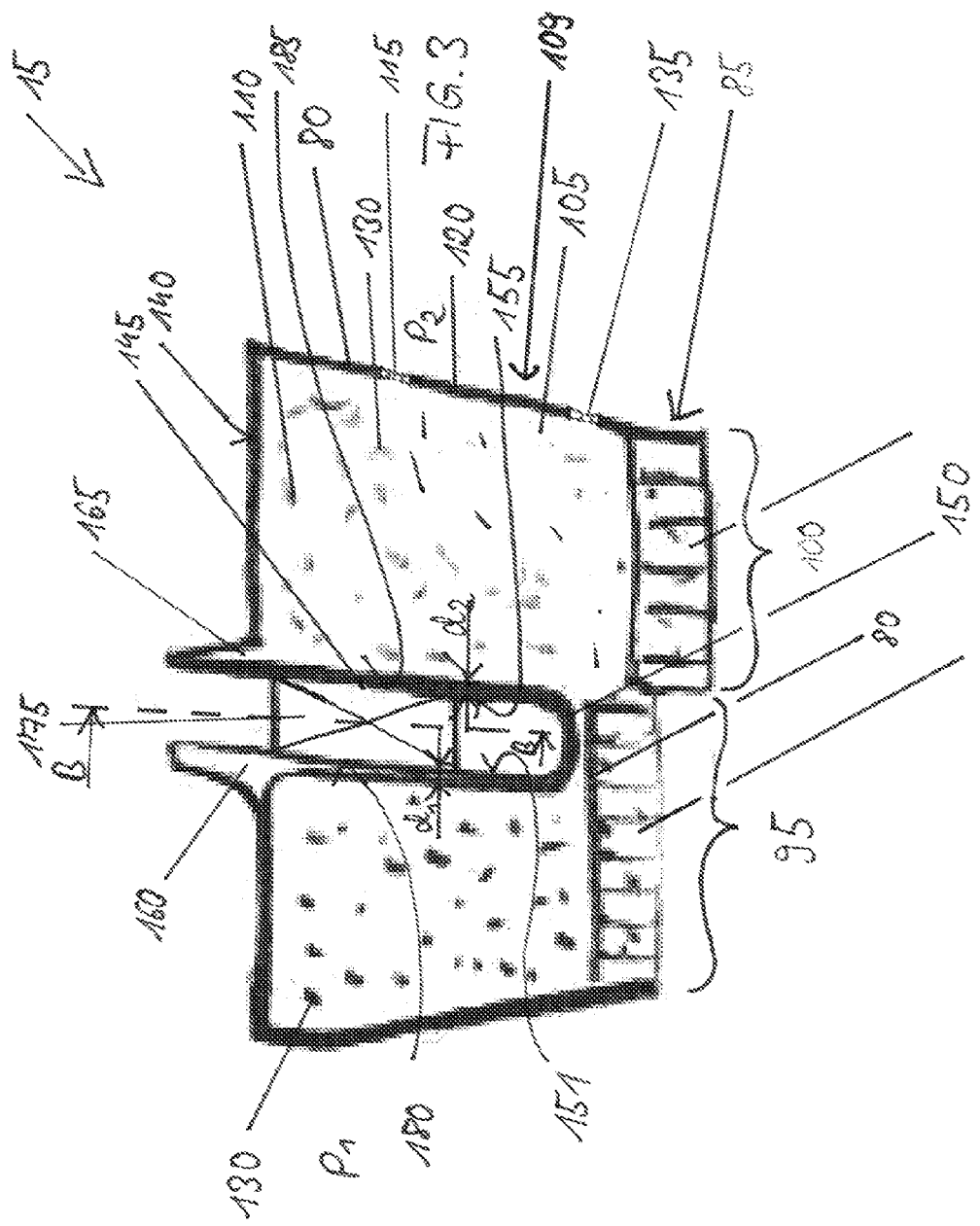
FIG. 3, a longitudinal section through the sealing arrangement shown in FIG. 2.
Figure 4:
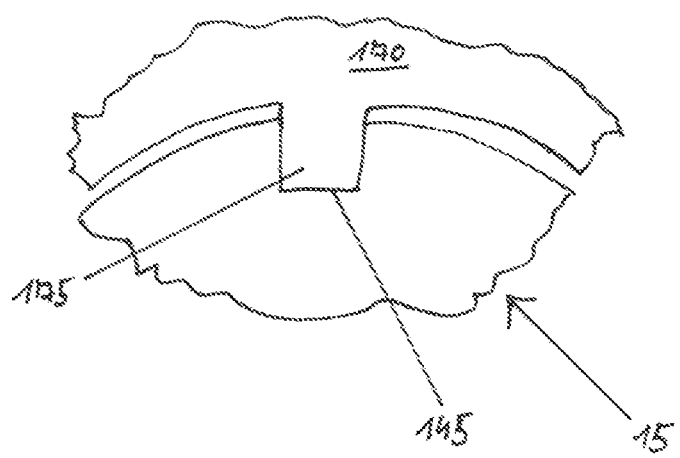
FIG. 4, a cutout of a cross section through the sealing arrangement shown in FIG. 3.

FIG. 1 shows a longitudinal section through a turbine 10 and FIG. 2 shows a cutout of the longitudinal section shown in FIG. 1 through the turbine 10 with a sealing arrangement 15. FIG. 3 shows a longitudinal section through the sealing arrangement 15 shown in FIG. 2. FIG. 4 shows a cutout of a cross section through the sealing arrangement 15 shown in FIG. 3 along a sectional plane B-B shown in FIG. 3. In the following, identical components will be identified with the same reference numbers. Furthermore, FIGS. 1 to 4 will be explained jointly so as to facilitate understanding.

An exhaust gas 20 coming from a combustion chamber, which is not illustrated, flows from left to right in FIGS. 1 and 2 through the turbine 10 of an aircraft gas turbine 11. In this case, the turbine 10 comprises a drum 25, which is mounted so as to rotate about an axis of rotation 30. The turbine 10 comprises a plurality of stages 35, 40, 45, with a stator 50 being arranged in front of a rotor disk 55 for each stage 35, 40, 45. Each stator 50 comprises at least one guide vane ring 60 with at least one guide vane 61, which is designed so as to divert the exhaust gas flow 20 in the peripheral direction. The rotor disk 55 comprises at least one rotor blade 65 arranged at the drum 25 on the radially outer side. The rotor blade 65 is driven by the exhaust gas flow 20, so that the drum 25 is put into rotation. On the radially inner side, the rotor blade 65 is joined to the drum 25 via a blade root 70. In order to prevent the radially rotating rotor blade 65 from striking against the guide vane ring 60 when the turbine 10 is in operation, the rotor blade 65 is arranged at a distance from the guide vane ring 60 via a gap 75. A first pressure $p_1$ is usually applied in front of the stator 50. After the stator 50, on a downstream side of the stator 50, a second pressure $p_2$ is applied. The first pressure $p_1$ is greater than the second pressure $p_2$ in this case. In order to circumvent any pressure equalization at the stator 50 on the radially inner side, the stator 50 or the guide vane ring 60 has the sealing arrangement 15 arranged on the radially inner side with respect to the guide vane 61.

The sealing arrangement 15 comprises an annular structure 80, which has a rectangular, preferably a trapezoidal, cross section. However, other cross-sectional shapes of different design are also conceivable. On the radially inner side, a sealing structure 85 is provided at the annular structure 80, in which sealing elements 90, which are arranged at the drum 25, engage. The sealing structure 85, together with the sealing elements 90, prevent any leakage flow of the exhaust gas flow 20 due to the pressure difference between the first pressure $p_1$ and the second pressure $p_2$ axially between the sealing arrangement 15 and the drum 25. In this case, the sealing structure 85 preferably comprises a honeycomb structure or foam-like structure. The sealing structure 85 has a first sealing segment 95, arranged on the upstream side, and a second sealing segment 100, arranged on the downstream side with respect to the first sealing segment 95. The sealing segments 95, 100 are arranged with a radially inward displacement with respect to each other in this case, with one sealing element 90 engaging in each sealing segment 95, 100. As a result of the radial displacement of the sealing segments 95, 100, the sealing structure 85 can be adapted to the geometric shape of the drum 25 or to the arrangement of the sealing elements 90 at the drum 25. In FIGS. 1 and 2, the adaptation of the sealing segments 95, 100 is chosen such that the first sealing segment 95 is arranged in a radially inner-lying manner with respect to the second sealing segment 100. It is also conceivable for the second sealing segment 100 to be arranged in a radially inner-lying manner with respect to the first sealing segment 95. Alternatively, it is conceivable that both sealing segments 95, 100 are arranged radially at the same level.

The annular structure 80 encloses an annular interior space 105, which, in this embodiment, is completely filled with a hollow cell structure 109, which is designed as a foam structure 110. The foam structure 110 has individual cells or pores 130. Alternatively, it is also conceivable that the annular interior space 105 is filled only partially, preferably, however, to at least 50%, ideally to at least 80%, with the foam structure 110. In this case, it is advantageous that, when there is only partial filling of the annular interior space 105 with the foam structure 110, the latter is arranged preferably on the radially outer side.

The foam structure 110 comprises, as material, an open-pored foam, preferably an open-pored metallic foam. Advantageously, the annular structure 105 or the foam structure 110 has at least one of the following materials: steel, aluminum, ceramic, titanium. The foam structure 110 further has a first mean pore size. A mean pore size is understood to refer to an average value of the size of individual pores 130 of the foam structure 110 or of the sealing structure 85, determined over a majority of pores 130. The sealing structure 85 has a second mean pore size, with the first mean pore size of the foam structure 110 being smaller than the second mean pore size of the sealing structure 85. In this way, it is ensured that the sealing elements 90 can engage in the sealing structure 85 with little friction. Furthermore, it is ensured at the same time by the smaller mean first pore size of the foam structure 110 that the sealing arrangement 15 is designed to be especially rigid due to the foam structure 110.

The annular structure 80 encloses the foam structure 110 essentially completely and seals the foam structure 110 against the surroundings of the sealing arrangement 15, especially against the exhaust gas flow 20, essentially completely. In order to make possible a pressure equalization between the annular interior space 105 and the surroundings of the sealing arrangement 15, the annular structure 80 has a first passage opening 115. In this case, the first passage opening 115 is arranged at a lateral surface 120 of the annular structure 80 on the downstream side. The first passage opening 115 connects the surroundings of the sealing arrangement 15 to the annular interior space 105 of the annular structure 80. Under the operating conditions, the sealing arrangement 15 of the turbine 10 is heated to up to 600° C. Owing to the open-pored design of the foam structure 110, the gases entrapped in the foam structure 110 can be exchanged or flow between individual pores 130 of the foam structure 110 and flow out of the annular structure 80 via the first passage opening 115 when there is a higher pressure in the annular interior space 105. In order to facilitate the flow of the gases trapped in the individual pores 130 out of the annular structure 80, a second passage opening 135 is provided on the radially outer side with respect to the first passage opening 115. The second passage opening 135 is arranged on the same lateral surface 120 as the first passage opening 115 in this case so as to prevent any gas from flowing through the foam structure 110 owing to the pressure difference between the first pressure $p_1$ and the second pressure $p_2$ in the axial direction. Obviously, the passage openings 115, 135 can also be arranged on another lateral surface of the annular structure 105. It is also possible to dispense with the passage openings 115, 135.

The sealing arrangement 15 further comprises an uptake 145 at an outer circumferential surface 140, which is arranged on the annular structure 105 lying opposite the sealing structure 85. The uptake 145 extends in this case essentially perpendicular to the axis of rotation 30 from the outer peripheral surface 140 toward the sealing structure 85. In this case, the uptake 145 is open radially outward. In the embodiment, a plurality of uptakes 145 are provided, which are arranged in the peripheral direction at a regular spacing with respect to one another on the outer peripheral surface 140. The radial extension of the uptake 145 is chosen such that an uptake end 150 of the uptake 145 is arranged at a radial distance to the sealing structure 85, so that both the annular structure 80 and the foam structure 110 are arranged between the uptake end 150 and the sealing structure 85. In this way, it is ensured that a pressure equalization can also occur for the pores 130 of the foam structure 110 that are arranged on the left side of the uptake 145 via the passage openings 115, 135 arranged on the right side of the uptake 145. Furthermore, the arrangement of the annular structure 80 and the foam structure 110 between the uptake end 150 and the sealing structure 85 provides for a rigid design of the sealing arrangement 15, so that it is prevented that, when the turbine 10 is in operation, the sealing arrangement 15 can be induced to undergo undesired vibration. The uptake 145 comprises a first uptake surface 151 arranged on the left side and a second uptake surface 155 arranged on the right on the downstream side, with the first uptake surface 151 or the second uptake surface 155 being oriented essentially perpendicular to the axis of rotation 30 of the turbine 10. Obviously, an angled arrangement of the contact surfaces 151, 155 with respect to the axis of rotation 30 is also conceivable. The first contact surface 151 is designed to be parallel to the second contact surface 155. The annular structure 80 has a first overhang 160 on the upstream side at the outer peripheral surface 140 on the radially outer side and a second overhang 165 arranged on the downstream side with respect to the first overhang 160. As a result of the overhangs 160, 165, the uptake side 145 is extended radially outward and the contact surfaces 150, 155 are enlarged.

The stator 50 has an annular member 170 on the radially inner side, which comprises a plurality of spokes 175. The spokes 175 are designed in this case as sliding elements, which, at their end sides 180, 185 each rest against the contact surfaces 151, 155 assigned to them. In this way, it is ensured that, when the guide vane ring 60 is heated, any change in the diameter of the annular member 170 can be compensated by sliding of the end sides 180, 185 of the spokes 175 in the uptake 145 at the respective contact surfaces 151, 155. In their design, the spoke 175 and the corresponding uptake 145 are adapted to each other such that any twisting of the sealing arrangement 15 at the annular member 170 is prevented and, at the same time, a guiding and fixixng in place of the sealing arrangement 15 at the annular member 170 is ensured.

On account of the elevated first pressure $p_1$ on the upstream side of the sealing arrangement 15 in comparison to the second pressure $p_2$ prevailing on the downstream side on the right in FIG. 3, the sealing arrangement 15 is pressed against a first end side 180 of the spoke 175, which faces the first contact surface 151, with a pressing force F due to the positive pressure difference between the first pressure $p_1$ and the second pressure $p_2$ via the first contact surface 151. In this case, the annular structure 80 has a first wall thickness $d_1$ at the first contact surface 151 that is greater than a second wall thickness $d_2$ of the annular structure 80 at the second contact surface 155. The thicker first wall thickness $d_1$ of the annular structure 80 continues further in the first overhang 160, so as, also via the first overhang 160, to be able to introduce an increased pressing force F on the spokes 175 via the first contact surface 151. The second contact surface 155 rests against a second end side 185 of the spoke 175 and serves to guide the annular structure 80 at the annular member 170. On account of the smaller forces applied to the second contact surface 155, the second overhang 165 can be made smaller or more delicate in its design than the first overhang 160. This embodiment makes possible a weight-optimized and hence lower-cost design of the sealing arrangement 15. If the sealing arrangement 15 is employed in a compressor, instead of in a turbine 10, it is advantageous, on account of the higher pressure $p_2$ on the downstream side in comparison to the first pressure $p_1$, to design the second wall thickness $d_2$ at the second contact surface 155 to be greater than the first wall thickness $d_1$ at the first contact surface 151. Obviously, it is also conceivable that the two wall thicknesses $d_1$ and $d_2$ can be designed to be equal in value.

In the embodiment, the uptake 145 extends in sections in the peripheral direction. Obviously, it is also conceivable that the uptake 145 is designed to extend around the entire periphery. In the embodiment, the annular structure 80 has a rectangular or a trapezoidal cross section. Obviously, cross sections different from the cross sections shown in FIGS. 1 to 3 are also conceivable. It would also be conceivable that, for example, the annular structure 80 comprises a circular or elliptical or polygonal cross section. Furthermore, it is noted that the overhangs 160, 165 can obviously be designed to be radially shorter or longer. The overhangs 160, 165 can also be dispensed with, given an adequate depth of the uptake 145 in the sealing arrangement 15.

As a result of the above-described design of the sealing arrangement 15 and as a result of the filling of the annular interior space 105 with the foam structure 110, it is possible to provide an especially rigid sealing arrangement 15. Furthermore, the filling of the annular interior space 105 can result in the prevention of any vortexing or an increased friction of gases in the annular interior space 105 of the annular structure 80. This applies particularly in the case when the annular interior space 105 is completely filled with the foam structure 110.

It is further noted that, in FIGS. 1 and 2, the application of the sealing arrangement 15 in the turbine 10 is shown in a third stage 45. Obviously, the described sealing arrangement 15 can also be employed in the other stages 35, 40. The turbine 10 is intended to serve, by way of example, for the application of the sealing arrangement 15 in a compressor of the gas turbine 11 as well.

Figure 5:
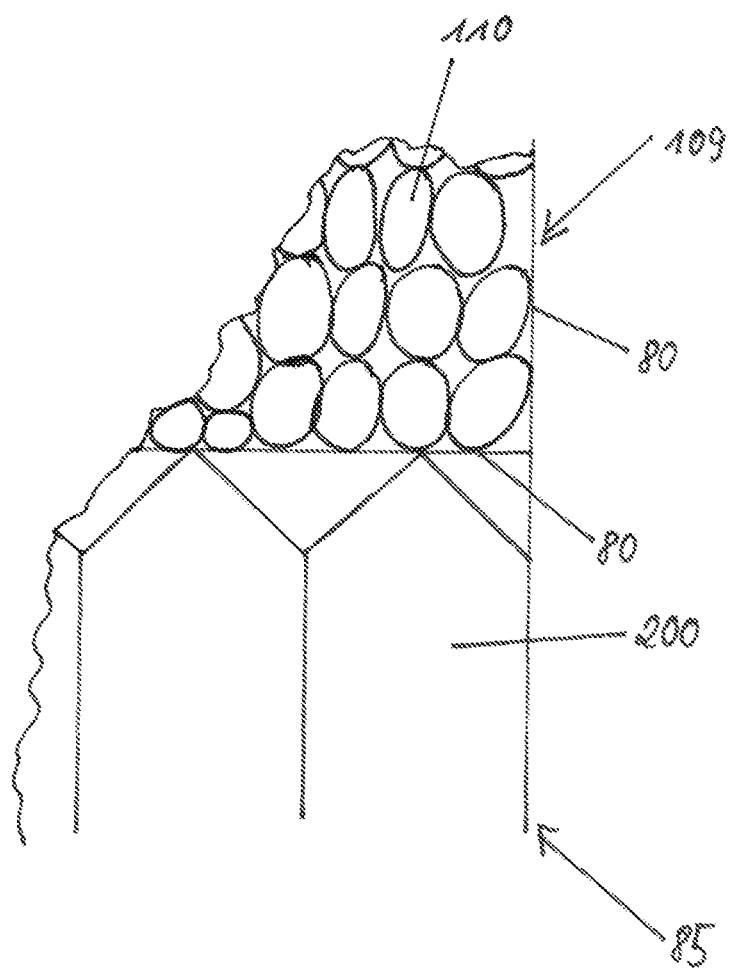
FIG. 5, a longitudinal section through a variant of the sealing arrangements shown in FIG. 2.

FIG. 5 shows a longitudinal section through a variant of the sealing arrangement 15 shown in FIG. 2. The sealing arrangement 15 is substantially identical to the sealing arrangement 15 explained above. In departure from it, however, the first mean pore size of the foam structure 110 is greater than the mean pore size of the foam structure 110 shown in FIG. 3. In this way, it is possible to provide an especially lightweight and rapidly fabricated sealing arrangement 15.

Figure 6:
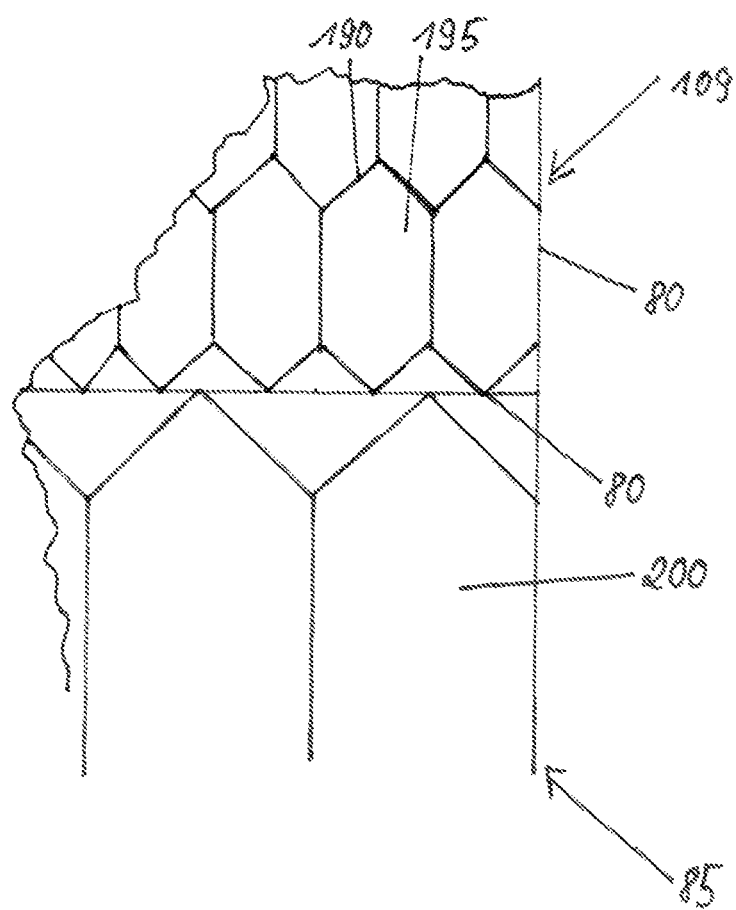
FIG. 6, longitudinal section through another embodiment of the sealing arrangement shown in FIG. 2.

FIG. 6 shows a longitudinal section through another embodiment of the sealing arrangement shown in FIG. 2. The sealing arrangement 15 is substantially identical to the embodiments explained in FIGS. 1 to 5; unlike these, the hollow cell structure 109 comprises a support structure 190, which has a plurality of honeycombs 195. The honeycombs 195 are designed as hexagons in the embodiment. Obviously, other shapes are also conceivable. In this embodiment, the individual honeycombs 195 of the support structure 190 extend radially outward and thus have the same orientation as the honeycombs 200 of the sealing structure 85. Obviously, a different orientation—for example, in the axial direction—is also conceivable.

Figure 7:
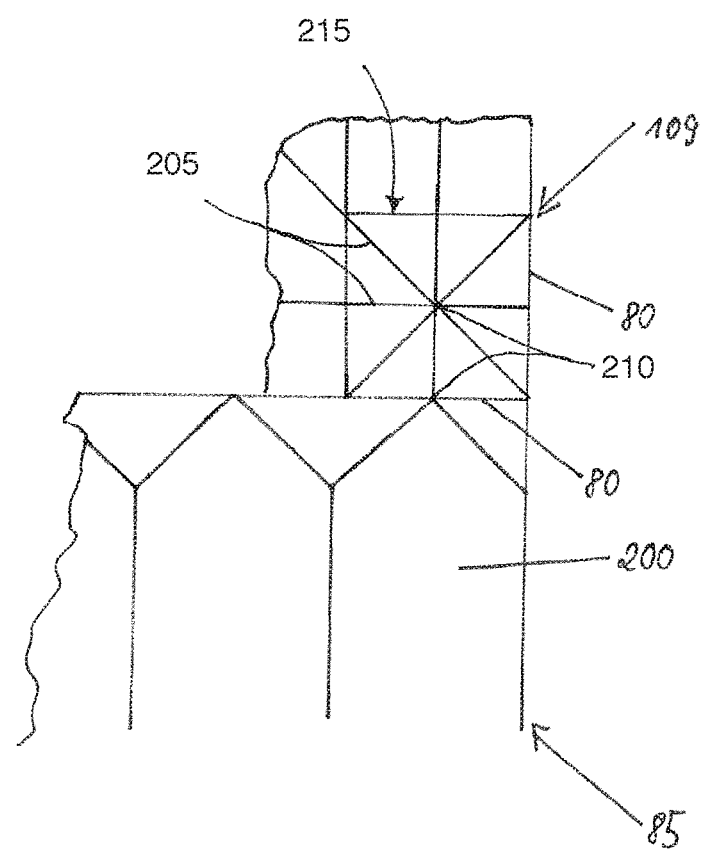
FIG. 7, a longitudinal section through another embodiment of the sealing arrangement shown in FIG. 2.

FIG. 7 shows a longitudinal section through another embodiment of the sealing arrangement 15 shown in FIG. 2. The sealing arrangement 15 is substantially identical to the embodiments explained in FIGS. 1 to 6; unlike these, the support structure 190 is designed as a framework. In this case, the support structure 190 comprises a plurality of webs 205. The webs 205 are linked to one another at nodal points 210. Furthermore, a portion of the webs 205, which are adjacent to the annular structure 80, are linked both to other webs 205 and to the annular structure 80 at the nodal points 210. As a result, it is possible to provide an especially rigid hollow cell structure 109.

It is noted that the diffrent embodiments of the hollow cell structure 109 shown in Figures 1 to 7 can also be combined with one another in order to adapt the rigidity of the sealing arrangement 15 to be appropriate to the load.

In the embodiments shown, the annular structure 80 is designed to be rectilinear between the hollow cell structure 109 and the sealing structure 85. Obviously, it is also conceivable that the annular structure 80 is integrated in the sealing structure 85 or foam structure 110 and follows, for example, the the course of a wall of the sealing structure 85 and/or of the foam structure 110 and thus is designed, for example to be corrugated or partially honeycombed. Also conceivable is a continuous transition from the hollow cell structure 109 to the sealing structure 85.

It is especially advantageous when the sealing arrangement 15 is fabricated by means of a selective laser melting process or by means of a selective laser sintering process or by means of a laser powder deposition welding process. This kind of fabrication has the advantage that, defined by means of a laser, the individual pores 130 of the foam structure 110 can be fixed in their pore size. In this way, any scattering in terms of the porosity or the size of the pores 130 is avoided. It is also possible for the annular structure 80 to be defined so as to be particularly thin-walled in design, because, through bonding of the foam material 110 to the annular structure 80, a unit constructed of one piece and uniform in material can be provided, which is designed to be especially rigid and free of material boundaries, so that any abrasion at such a material boundary between the foam material 110 and the annular structure 80 can be avoided because the boundary does not exist.

Furthermore, it is possible by means of the named fabrication process to dispense with additional mounting steps for fabrication of the sealing arrangement 15. Beyond this, it is possible, on account of the defined creation of the individual pores 130 of the foam structure 110 by means of the selective laser melting process or by means of a selective laser sintering process or by means of the laser powder deposition welding process to provide large-volume sealing arrangements 15, so that larger cavities can be filled on the radially inner side between the drum 25 and the guide vane ring 60 as well.

In addition, the large-volume design of the sealing arrangement 15 can also make possible an improved shielding of the radially inner-lying region between the guide vane ring 60 and the drum 25. Parasitic secondary flows are also largely prevented. Furthermore, by way of the selective laser melting process or selective laser sintering process or the laser powder deposition welding process, the sealing arrangement 15 can be dimensioned in a load-adapted manner and additional joining elements, such as screws or rivets, which are subject to critical design in the fabrication of high-temperature components, can be avoided. It is especially advantageous, moreover, when the passage openings 115, 135 are suitable not only for pressure equalization in terms of their arrangement and design, but also for removal of excess material from the selective laser melting/sintering process or laser powder deposition welding process.

The generative manufacture of the sealing arrangement 15 by means of one of the above-mentioned processes and the above-described design of the sealing arrangement 15 makes it possible, furthermore, to freely shape the annular structure 80 in terms of its contours and to adjust it freely to the geometry of the components adjacent to the sealing arrangement 15. The above-described sealing arrangements 15 have minimal, load-adapted wall thicknesses with avoidance of doublings in design and without the use of junctions, so that an especially weight-optimized sealing arrangement 15 can be provided. In addition, there is less friction due to smaller cavities and smooth outer walls.

The invention claimed is:

1. A sealing arrangement (15) for a guide vane ring (60) of a turbomachine (11),
   wherein the sealing arrangement (15) comprises a thin-walled annular structure (80) that is substantially closed on all sides, and
   wherein the annular structure (80) delimits an annular interior space (105),
   wherein
   a hollow cell structure (109), which is designed to mechanically support the annular structure (80), is provided in the annular interior space (105),
   wherein the annular structure (80) comprises at least one passage opening (115, 135), which connects the annular interior space (105) to the surroundings of the sealing arrangement (15), wherein the at least one passage opening (115, 135) is designed for pressure equalization of the annular interior space (105) with the surroundings,
   wherein at least one other passage opening (135) is provided for pressure equalization of the annular interior space (105), wherein the passage opening (115) and the other passage opening (135) are arranged on the same side (120) of the annular structure (80).

2. A sealing arrangement (15) for a guide vane ring (60) of a turbomachine (11),
   wherein the sealing arrangement (15) comprises a thin-walled annular structure (80) that is substantially closed on all sides, and
   wherein the annular structure (80) delimits an annular interior space (105),
   wherein
   a hollow cell structure (109), which is designed to mechanically support the annular structure (80), is provided in the annular interior space (105),
   wherein a sealing structure (85) is provided in a radially inner-lying manner at the annular structure (80), which has a honeycomb or foam-like design, wherein the hollow cell structure (109) comprises a first mean pore size and the sealing structure (85) comprises a second mean pore size, wherein the first mean pore size of the hollow cell structure (109) is smaller than the second mean pore size of the sealing structure (85).

* * * * *